United States Patent
Fox et al.

(10) Patent No.: US 11,100,251 B2
(45) Date of Patent: Aug. 24, 2021

(54) CLEANING SENSITIVE DATA FROM A DIAGNOSTIC-READY CLEAN COPY

(71) Applicant: INTERNATIONAL BUSINESS MACHINES CORPORATION, Armonk, NY (US)

(72) Inventors: Michael J. Fox, New Hill, NC (US); Diane Iupe Shannon, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 16/114,540

(22) Filed: Aug. 28, 2018

(65) Prior Publication Data
US 2020/0074108 A1    Mar. 5, 2020

(51) Int. Cl.
*G06F 21/62* (2013.01)

(52) U.S. Cl.
CPC ........ *G06F 21/6245* (2013.01); *G06F 21/629* (2013.01); *G06F 2221/2143* (2013.01)

(58) Field of Classification Search
CPC ............... G06F 21/6245; G06F 21/629; G06F 2221/2143; G06F 2212/1052
See application file for complete search history.

(56) References Cited

U.S. PATENT DOCUMENTS

| | | | |
|---|---|---|---|
| 8,156,159 B2 | 4/2012 | Ebrahimi | |
| 8,688,700 B2 | 4/2014 | Fallen | |
| 9,239,909 B2 | 1/2016 | Tedesco | |
| 9,477,843 B2 | 10/2016 | Nairn | |
| 9,774,572 B2 | 9/2017 | Mason | |
| 2013/0167192 A1* | 6/2013 | Hickman | G06F 21/60 726/1 |
| 2016/0239668 A1* | 8/2016 | Bellert | G06F 21/10 |
| 2016/0378999 A1* | 12/2016 | Panchapakesan | G06F 21/6254 726/26 |
| 2018/0082072 A1 | 3/2018 | Hosie | |

* cited by examiner

*Primary Examiner* — Chau Le
*Assistant Examiner* — Andrew Suh
(74) *Attorney, Agent, or Firm* — Cantor Colburn LLP; Teddi Maranzano (57) ABSTRACT

A computer-implemented method includes receiving, by an application, a request to copy application data of the application, where the application data includes sensitive data generated by the application. The application identifies each instance of the sensitive data in the application data. The application generates a clean copy of the application data, where generating the clean copy includes removing each instance of the sensitive data from the application data. The clean copy is returned responsive to the request to copy the application data.

11 Claims, 3 Drawing Sheets

CLEANING SENSITIVE DATA FROM A DIAGNOSTIC-READY CLEAN COPY

BACKGROUND

The present invention relates to computer diagnostics and, more specifically, to cleaning sensitive data from a diagnostic-ready clean copy.

Security organizations and customers are becoming more concerned with the security of customer data. For example, the European General Data Protection Regulation (GDPR) requires strict controls over users' personally identifiable information (PII), so as to enable users themselves to direct how their PII is used.

Often, when trouble-shooting a problem associated with a computer application, a data dump is generated and included in problem documentation. The problem documentation, including the data dump, is used by service personnel to recreate and thus evaluate the problem. Data dumps are likely to contain PII, such as usernames and passwords, even though the PII is likely not of interest to the service personnel. As a result, due to GDPR as well as other security standards, the entire problem documentation may need to be classified as PII. This changes the operations that can be performed on the problem documentation, because privacy must be preserved.

For example, Network Configuration Assistant is a web application that provides a graphical user interface (GUI) for generating configuration files for z/OS Communications Server. Using the Network Configuration Assistant as a tool, a user describes his or her desired configuration using wizards and panels, and the tool stores the created configuration in a file that uses a proprietary format. This file is referred to as a backing store. When the customer is ready to install a configuration, the Network Configuration Assistant generates configuration files for z/OS Communications Server. Following are two examples of how sensitive information can get into the backing store:

As part of configuration installation, Network Configuration Assistant can store the generated MVS configuration files on a local computer system, or Network Configuration Assistant can transmit the files to a remote system, such as through file transfer protocol (FTP). To support this FTP capability, Network Configuration Assistant can store FTP login information in the backing store.

With the Network Configuration Assistant, a user can create a certificate-revocation checking rule, which describes how to check whether security certificates have been revoked. For example, the user can request that security certificates be checked against a Lightweight Directory Access Protocol (LDAP) database. For such a certificate-revocation checking rule to be valid, however, login information for access the LDAP database must be specified. This login information is stored in the backing store as part of the certificate-revocation checking rule.

When a customer reports a problem with the Network Configuration Assistant tool, an efficient method of diagnosing the problem is for the customer to send his or her backing store to service personnel. This allows the service personnel to load the customer's configuration and recreate the issue locally, where debuggers and other development tools can be used to help identify a source of the problem. However, the backing store may include PII, such as the login information in the above examples.

To address the inclusion of PII in problem documentation, for Network Configuration Assistant as well as other software, a service agent may utilize a secure vault. Problem documentation containing PII is stored in the vault, where it can be isolated to comply with standards for the use of PII.

SUMMARY

Embodiments of the present invention are directed to a computer-implemented method for generating a clean copy. A non-limiting example of the computer-implemented method includes receiving, by an application, a request to copy application data of the application, where the application data includes sensitive data generated by the application. The application identifies each instance of the sensitive data in the application data. The application generates a clean copy of the application data, where generating the clean copy includes removing each instance of the sensitive data from the application data. The clean copy is returned responsive to the request to copy the application data.

Embodiments of the present invention are directed to a system for generating a clean copy. A non-limiting example of the system includes a memory having computer-readable instructions and one or more processors for executing the computer-readable instructions. The computer-readable instructions include receiving, by an application, a request to copy application data of the application, where the application data includes sensitive data generated by the application. Further according to the computer-readable instructions, the application identifies each instance of the sensitive data in the application data. The application generates a clean copy of the application data, where generating the clean copy includes removing each instance of the sensitive data from the application data. The clean copy is returned responsive to the request to copy the application data.

Embodiments of the invention are directed to a computer-program product for generating a clean copy, the computer-program product including a computer-readable storage medium having program instructions embodied therewith. The program instructions are executable by a processor to cause the processor to perform a method. A non-limiting example of the method includes receiving, by an application, a request to copy application data of the application, where the application data includes sensitive data generated by the application. Further according to the method, the application identifies each instance of the sensitive data in the application data. The application generates a clean copy of the application data, where generating the clean copy includes removing each instance of the sensitive data from the application data. The clean copy is returned responsive to the request to copy the application data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, using a secure vault to isolate problem documentation that includes PII is effective for maintaining that PII in a secure manner. However, use of such a vault creates inefficiencies, because data in the vault can be accessed and used only from within the vault. Thus, recreation of any problems through the use of problem documentation must occur in the vault. In some cases, however, the service tools needed for recreation are not available in the vault, which can make problem recreation difficult or impossible. Use of the vault therefore makes it cumbersome and challenging to debug problems, degrading efficiency in servicing field problems.

Turning now to an overview of the aspects of the invention, one or more embodiments of the invention address the above-described shortcomings of the prior art by providing a mechanism for an application to identify its own sensitive data, such as PII, and exclude it from a clean copy, which may be a data dump, backing store, or other form of copy. Because the application understands its own data, the application itself can identify sensitive data. Further, because the application knows the required format of its own data, the application can obfuscate the sensitive data while maintaining a valid format, or syntax. Thus, when the resulting clean copy is used for diagnostic purposes, the clean copy will still read as valid, thus enabling issues to be recreated without spurious errors thrown due to invalid data due to the removal of the sensitive data.

The above-described aspects of the invention address the shortcomings of the prior art by enabling a software application to clean its own application data that includes sensitive data. By performing this task at the application level, rather than at the level of the operating system, the type and form of data is known, thus enabling proper masking according to some embodiments of the invention. Thus, customers and security regulators can be confident that the clean copy, such as a backing store, is clean of PII or other sensitive data. The clean copy may thus be used for diagnostic purposes outside of a secure vault.

Figure 1:
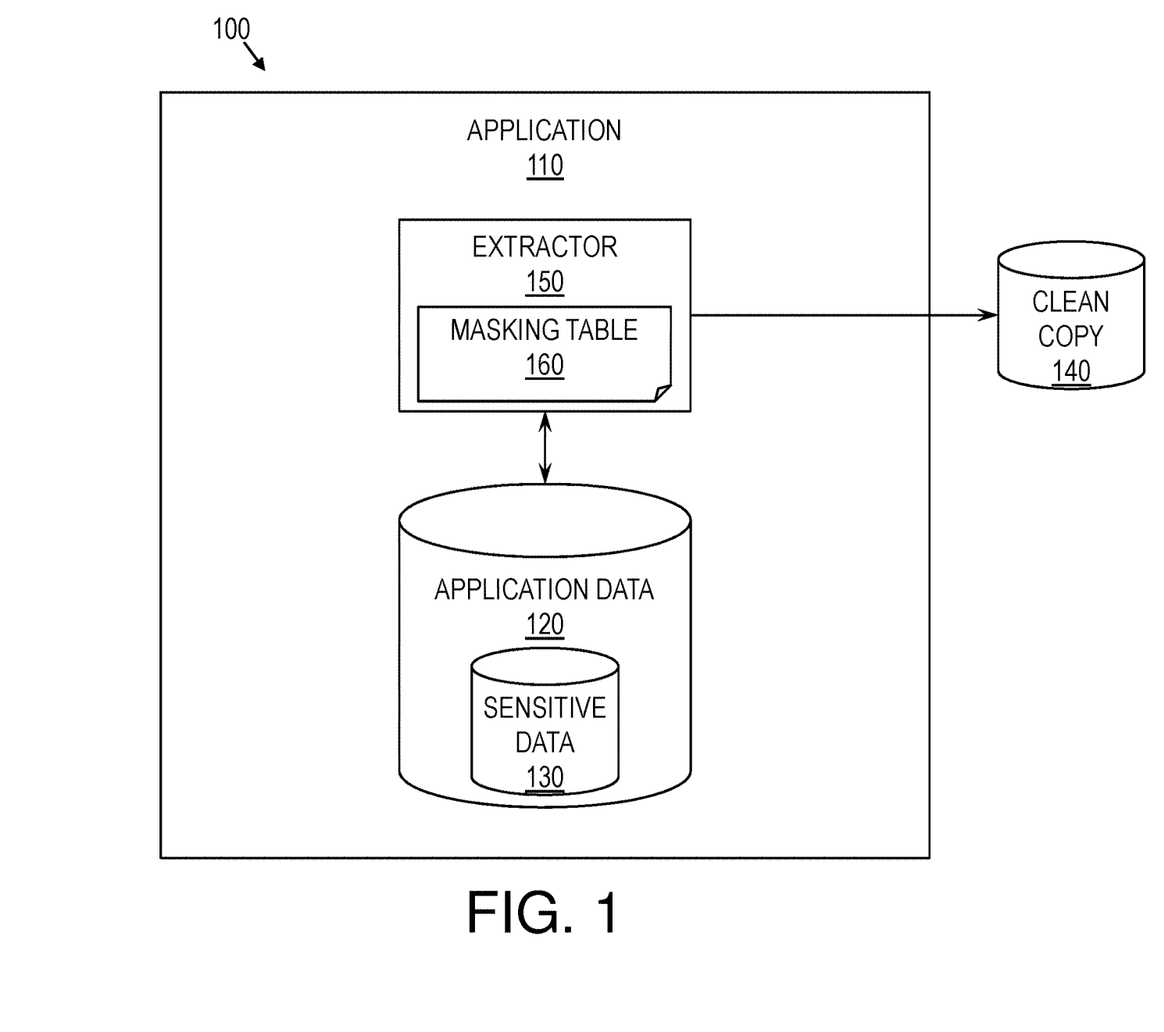
FIG. 1 is a diagram of a clean-copy system according to some embodiments of the invention.

Turning now to a more detailed description of aspects of the present invention, FIG. 1 is a diagram of a clean-copy system 100 according to some embodiments of the invention. As shown, the clean-copy system 100 may be incorporated into a software application 110. The clean-copy system 100 may copy at least a portion of the application data 120 of the application 110, where the application data 120 includes sensitive data 130, such that the sensitive data 130 may be excluded during the copying. This sensitive data 130 may include PII or other data deemed by the user or by the application 110 to be sensitive. The clean-copy system 100 may thus generate a clean copy 140, which may be a modified copy of at least a portion of the application data 120.

Through its operation, the application 110 may generate and use the application data 120, which may be stored on a computer system 300 (FIG. 3) on which the application 110 runs. The application data 120 may be saved in a proprietary format recognized by the application 110, but not necessarily recognized by other applications or by an operating system 311 (FIG. 3) of the computer system 300. For example, and not by way of limitation, a backing store may be considered application data 120. Typically, to properly store and use the application data 120, an application 110 keeps track of the nature of the application data 120, such as the type and format of various pieces of data within the application data 120. The application data 120 may be stored in a proprietary format or in a format understood by other applications 110. In either case, the application data 120 may include a set of fields and associated values, which may be understood by the application 110.

Figure 3:
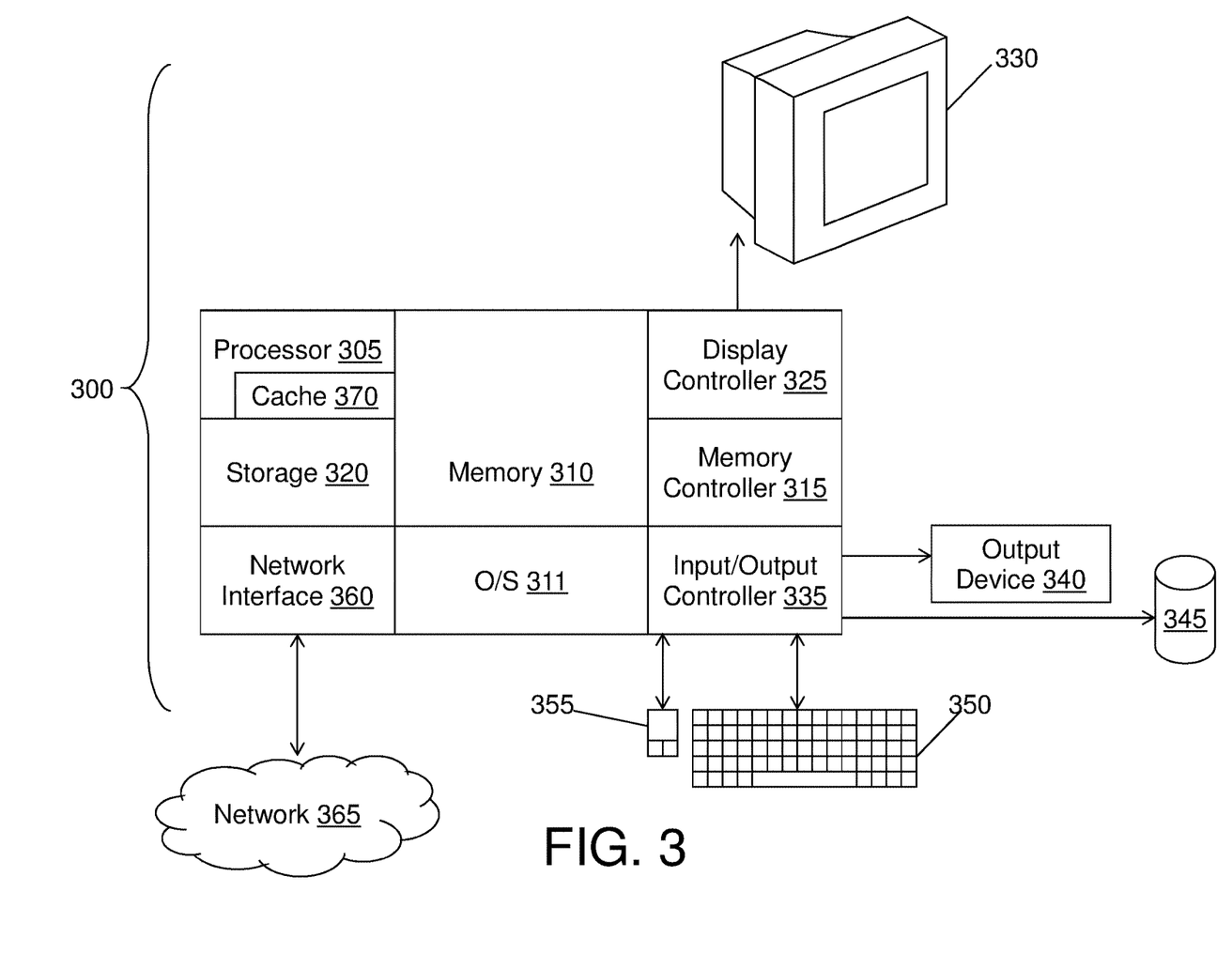
FIG. 3 is a block diagram of a computer system for implementing some or all aspects of the clean-copy system, according to some embodiments of the invention.

Typically, the application 110 knows virtual addresses of the application data 120, although the operating system 311 may be responsible for translating back and forth between the virtual addresses and physical addresses on the computer system 300. It will be understood that the application data 120 may reside in local memory, on a hard drive, or in a combination of both places. Although the operating system 311 may be needed to find the physical addresses of the application data 120, the operating system 311 may lack knowledge about the nature of the application data 120. Thus, according to some embodiments of the invention, the application 110 is in the best position to clean sensitive data 130 from copies of its application data 120, as described herein.

The application 110 may include an extractor 150 and a masking table 160, which may be integrated into the extractor 150. The masking table 160 may include information about each type of sensitive data 130 in the application data 120. Specifically, the masking table 160 may include enough information about the sensitive data 130 in the application data 120 to enable masking of that sensitive data 130. In some embodiments of the invention, before initial use, the masking table 160 is built so as to enable identification and masking of sensitive data 130 as described herein. For instance, for each field of the application data 120 that may include sensitive data 130, the masking table 160 may include, for example, an identifier of the field and a format representation of the field. In some embodiments of the invention, the format representation may be a masked version, or obfuscated version, of valid data in the field, complying with any format guidelines with which the sensitive data 130 potentially in that field must comply. It will be understood by one skilled in the art that the masking table 160 may take various forms, such as a file, a database table, a decision tree, or a series of if-then conditions incorporated into the application's program code, for example. The extractor 150 and the masking table 160 may be implemented in hardware, software, or a combination of both. For instance, these components may be implemented as a software module or a specialized hardware device.

When a clean copy 140 is requested, the extractor 150 may extract the application data 120 needed for the clean copy 140 and may replace each instance of sensitive data 130 with a masked version of the sensitive data 130, where the masked version complies with any syntactic requirements (i.e., formatting requirements) with which the sensitive data 130 must comply. Thus, according to some embodiments of the invention, the clean-copy system 100 is capable of generating a clean copy 140 that has been cleaned of sensitive data 130, while still retaining the original format of the sensitive data 130 that exists in the application data 120 utilized to make the clean copy 140. In some embodiments of the invention, the clean copy 140 excludes sensitive data 130, which may be masked or simply deleted in the clean copy 140. In some embodiments of the invention, when a user configures copy settings, the user can specify whether the copy should be a clean copy 140 (i.e., excluding sensitive data 130) and can specify whether such a clean copy 140 should have the sensitive data 130 masked or deleted. If the user does not require a clean copy 140, then the application data 120 may be generated without modification of data values in the sensitive data 130. If the user requests a clean copy 140 with sensitive data 130 deleted, then the extractor 150 may delete, or opt not to transfer to the clean copy 140, each piece of sensitive data 130 when generating the clean copy 140. If the user requests a clean copy 140 with sensitive data 130 masked, then the extractor 150 may replace each piece of sensitive data 130 with a masked version of the sensitive data 130 when generating the clean copy 140.

However, if the user requests selective masking, then some instances of the sensitive data 130 may be masked while other instances are deleted. For example, and not by way of limitation, instances of the sensitive data 130 that do not have syntactic requirements may be deleted, while those with syntactic requirements may be replaced with corresponding masked versions. For another example, instances of the sensitive data 130 whose fields are known to be inessential to providing a valid syntax to the clean copy 140 as a whole may be deleted, while other instances of the sensitive data 130 may be masked.

Figure 2:
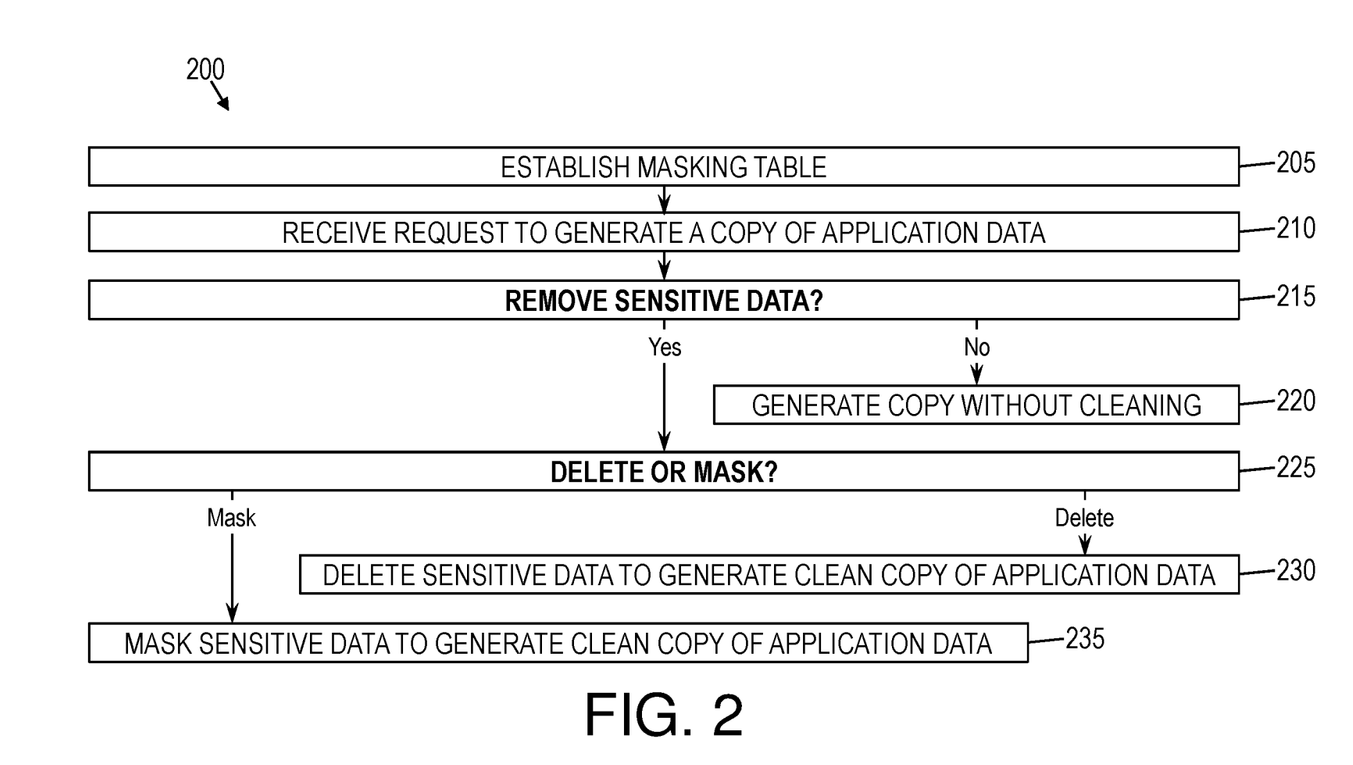
FIG. 2 is a flow diagram of a method of cleaning sensitive data to generate a diagnostic-ready clean copy, according to some embodiments of the invention.

FIG. 2 is a flow diagram of a method 200 of cleaning sensitive data 130 to generate a diagnostic-ready clean copy 140, according to some embodiments of the invention. At block 205, the masking table 160 may be established. At block 210, the clean-copy system 100 may receive a request to generate a clean copy 140 of all or a portion of the application data 120 of the application 110. The requested clean copy 140 may take various forms, such as, for example, a backing store, a data dump, or some other a full or partial collection of files known to the application 110. For example, and not by way of limitation, the clean copy 140 may be a modified copy of a backing store, where the clean copy 140 is generated for diagnostic purposes.

At decision block 215, it may be determined whether the request is associated with an indication to remove, or hide, sensitive data 130 in the application data 120. For instance, in some embodiments of this invention, an option may be presented to the user during a process of requesting or configuring the clean copy 140. This option may appear, for example, in copy configuration settings, in application 110 configuration settings, or on a file management page.

If the request is not associated with an indication that sensitive data 130 should be removed, then at block 220, a copy of the application data 120 may be generated without cleaning the sensitive data 130. Thus, this task may bypass use of the masking table 160. For example, and not by way of limitation, the extractor 150 may generate the clean copy 140 based on the application data 120, such as by copying at least a portion of the application data 120 to the clean copy 140. If the clean copy 140 is for diagnostic purposes, then the clean copy 140 may be incorporated into problem documentation for service.

If the request for a copy of the application data 120 includes an indication that the sensitive data 130 should be removed, then at decision block 225, it may be determined whether deletion or masking, or a combination of both, should be performed to remove the sensitive data 130. This determination may be made in various ways. For example, in some embodiments of the invention, only masking is available, and thus masking will be performed rather than deletion. For another example, either masking or deletion may be the default operation for removing sensitive data 130, and that default operation may be performed unless an alternative is indicated by the user. For another example, the request may be associated with an indication of whether to delete or mask the sensitive data 130. For example, and not by way of limitation, the application 110 may present to the user a set of options, including the option to delete, mask, or selectively mask the sensitive data 130, and the user may select one of such options. In that case, the selected option may be performed.

If the sensitive data 130 is to be deleted, then at block 230, the sensitive data 130 may be deleted from the copy of the application data 120 that forms the clean copy 140. In this case, when generating the clean copy 140, the extractor 150 may refer to the masking table 160. As discussed above, the masking table 160 may maintain an identifier of each field that may contain sensitive data 130. As such, the extractor 150 of the clean-copy system 100 may be enabled to recognize each instance of sensitive data 130, such as by checking field identifiers, while generating the clean copy 140. Each time an instance of sensitive data 130 is encountered in the application data 120, the sensitive data 130 may be deleted, such as by skipping the instance of the sensitive data 130 when generating the clean copy 140. This act of deleting may be performed as the application data 120 is being copied, or it may be performed after an initial copy is made, by making a pass through the copy to locate and delete each instance of sensitive data 130. If the clean copy 140 is for diagnostic purposes, then the clean copy 140 may be included in problem documentation for service.

If the sensitive data 130 is to be masked, or obfuscated, then the sensitive data 130 in the application data 120 may be masked in the clean copy 140, at block 235. In this case, when generating the clean copy 140, the extractor 150 may refer to the masking table 160. As discussed above, the masking table 160 may maintain an identifier of each field that may contain sensitive data 130. As such, the extractor 150 of the clean-copy system 100 may be enabled to recognize each instance of sensitive data 130 while generating the clean copy 140. Each time an instance of sensitive data 130 is encountered in the application data 120, the sensitive data 130 may be masked. To mask the sensitive data 130, each instance of the sensitive data 130 may be replaced by a respective masked version that meets the required format of that instance of the sensitive data 130.

As discussed above, the masking table 160 may maintain information about the format of each field containing sensitive data 130. In some embodiments of the invention, the masking table 160 maintains a masked version of each field that may contain sensitive data 130, where the masked version matches the required format of the respective field. In that case, each instance of the sensitive data 130 may be replaced in the clean copy 140 with the respective masked version corresponding to the field of the instance. For example, if a first instance of the application data 120 is recognized as being in a LDAP_Password field, then a masked version of this first instance may be the masked version associated with the LDAP_Password field. Alternatively, for example, each such masked version may be generated during the process of generating the clean copy 140, to comply with the format required for the respective instance of the sensitive data 130. For another example, after the first instance of the application data 120 is recognized as being in the LDAP_Password field, then a masked version of this first instance may be generated to comply with the format associated with the LDAP_Password field. In other words, for each instance of sensitive data 130 in the application data 120 to included in the clean copy 140, that instance may be replaced by a masked version (e.g., a dummy version including non-sensitive data) that is syntactically correct and would thus be deemed to have valid format, despite having an invalid value. As such, if the clean copy 140 is used for diagnostic purposes, errors stemming from data that does not meet expected requirements can be avoided. This act of replacing instances of the sensitive data 130 may be performed as the application data 120 is being copied, or it may be performed after an initial copy is made, by making a pass through the copy to locate and replace the sensitive data 130. If the clean copy 140 is for diagnostic purposes, then the clean copy 140 may be included in problem documentation for service.

Thus, in some embodiments of the invention, the clean-copy system 100 generates clean copy 140 that can be used for diagnostic purposes, or other purposes, by retaining the syntax of sensitive data 130 without retaining the sensitive data 130 itself in the clean copy 140. In some embodiments of the invention, the clean-copy system 100 is integrated with, or in communication with, an application 110 rather than integrated with an operating system 311 over which the application 110 runs. In this manner, the clean-copy system 100 may utilize the application's knowledge of the nature of application data 120. In contrast, an operating system 311 need not know the nature of the application data 120.

FIG. 3 is a block diagram of a computer system 300 for implementing some or all aspects of the clean-copy system 100, according to some embodiments of this invention. The clean-copy systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the clean-copy systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Clean-copy systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by an application, a request to copy application data of the application, wherein the application data comprises sensitive data generated by the application and wherein the request is for a selectively masked copy of the application data;
   identifying, by the application, each instance of the sensitive data in the application data and whether each instance of the sensitive data includes syntactic requirements;
   generating, by the application, a clean copy of the application data, wherein the generating the clean copy comprises:
   deleting each instance of the sensitive data from the application data that does not include syntactic requirements;
   determining a valid format of each instance of the sensitive data that includes syntactic requirements; and
   substituting, for each instance of the sensitive data that includes syntactic requirements, an instance of non-sensitive data with a format matching the substituted sensitive data, wherein the valid format comprises a syntax for the sensitive data; and
   returning the clean copy responsive to the request to copy the application data.

2. The computer-implemented method of claim 1 further comprising: a removing each instance of the sensitive data comprises deleting each instance of the sensitive data.

3. The computer-implemented method of claim 1, wherein the application data is saved in a proprietary format of the application.

4. The computer-implemented method of claim 1, wherein the sensitive data comprises personally identifiable information.

5. A system comprising:
   a memory having computer-readable instructions; and
   one or more processors for executing the computer-readable instructions, the computer-readable instructions comprising:
   receiving, by an application, a request to copy application data of the application, wherein the application data comprises sensitive data generated by the application and wherein the request is for a selectively masked copy of the application data;
   identifying, by the application, each instance of the sensitive data in the application data and whether each instance of the sensitive data includes syntactic requirements;
   generating, by the application, a clean copy of the application data, wherein the generating the clean copy comprises:
   deleting each instance of the sensitive data from the application data that does not include syntactic requirements; and
   determining a valid format of each instance of the sensitive data that includes syntactic requirements; and
   substituting, for each instance of the sensitive data that includes syntactic requirements, an instance of non-sensitive data with a format matching the substituted sensitive data, wherein the valid format comprises a syntax for the sensitive data; and returning the clean copy responsive to the request to copy the application data.

6. The system of claim 5 further comprising: a removing each instance of the sensitive data comprises deleting each instance of the sensitive data.

7. The system of claim 5, wherein the application data is saved in a proprietary format of the application.

8. The system of claim 5, wherein the sensitive data comprises personally identifiable information.

9. A computer-program product for generating a clean copy, the computer-program product comprising a computer-readable storage medium having program instructions embodied therewith, the program instructions executable by a processor to cause the processor to perform a method comprising:

receiving, by an application, a request to copy application data of the application, wherein the application data comprises sensitive data generated by the application and wherein the request is for a selectively masked copy of the application data;

identifying, by the application, each instance of the sensitive data in the application data and whether each instance of the sensitive data includes syntactic requirements;

generating, by the application, a clean copy of the application data, wherein the generating the clean copy comprises:

deleting each instance of the sensitive data from the application data that does not include syntactic requirements;

determining a valid format of each instance of the sensitive data that includes syntactic requirements; and substituting, for each instance of the sensitive data that includes syntactic requirements, an instance of non-sensitive data with a format matching the substituted sensitive data, wherein the valid format comprises a syntax for the sensitive data; and returning the clean copy responsive to the request to copy the application data.

10. The computer-program product of claim 9 further comprising: a removing each instance of the sensitive data comprises deleting each instance of the sensitive data.

11. The computer-program product of claim 9, wherein the sensitive data comprises personally identifiable information.

* * * * *